United States Patent
Meylan et al.

(10) Patent No.: US 8,437,312 B2
(45) Date of Patent: *May 7, 2013

(54) METHODS FOR INTRA BASE STATION HANDOVER OPTIMIZATIONS

(75) Inventors: Arnaud Meylan, San Diego, CA (US); Nathan Edward Tenny, Poway, CA (US); Peter Anthony Barany, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,784

(22) Filed: May 18, 2012

(65) Prior Publication Data

US 2012/0231796 A1 Sep. 13, 2012

Related U.S. Application Data

(63) Continuation of application No. 12/237,050, filed on Sep. 24, 2008.

(60) Provisional application No. 60/976,385, filed on Sep. 28, 2007.

(51) Int. Cl.
*H04W 4/00* (2009.01)
*H04J 3/16* (2006.01)
*H04W 36/00* (2009.01)

(52) U.S. Cl.
USPC ............. 370/331; 370/469; 455/436

(58) Field of Classification Search .......... None
See application file for complete search history.

(56) References Cited

U.S. PATENT DOCUMENTS 7,392,051 B2 6/2008 Rajala et al.
8,284,734 B2 10/2012 Meylan et al.
2004/0248575 A1* 12/2004 Rajala et al. ............. 455/436
2007/0291788 A1 12/2007 Sammour et al.
2009/0086676 A1 4/2009 Meylan et al.

FOREIGN PATENT DOCUMENTS

JP 2008502274 A 1/2008
JP 2008526094 A 7/2008

OTHER PUBLICATIONS

Alcatel: "RLC, MAC and HARQ context transfer for intra-eNB handover" 3GPP Draft; R2-063328_RLC, MAC and HArQ Context Transfer for Intra-ENB Handover, SRD Generation Partnership Project (3GPP), Mobile Competence Centre; 650, Route Des Lucioles; F-06921, Nov. 10, 2006, URL, http://www.3gpp.org/ftp/tsg_ran/WG2_RL2/TSGR2_56/Documents/R2-063328.zip.
International Search Report and the Written Opinion—PCT/US2008/077876, International Search Authority—European Patent Office—Oct. 22, 2009.
Taiwan Search Report—TW097137373—TIPO—Jan 10, 2012.
"Universal Mobile Telecommunications System (UMTS), Evolved Universal Terrestrial Radio Access (E-UTRA) and Evolved Universal Terrestrial Radio Access (E-UTRAN), Overall description, Stage 2 (3GPP TS 36.300 version 8.1.0 Release 8), ETSI TS 136.300", ETSI Standards, Lis, Sophia Antipolis Cedex, France, vol. 3-R2, No. V8.1.0, Jun. 1, 2007, XP014038500, ISSN: 0000-0001.

* cited by examiner

*Primary Examiner* — Clemence Han
(74) *Attorney, Agent, or Firm* — John J. Ketchum

(57) ABSTRACT

The method and apparatus as described are directed toward techniques and mechanisms to improve efficiency in wireless communication networks through optimization of handover scenarios. Determining whether an intra-base station or inter-node-B handover is to be performed, and determining the protocol layers to reset during the handover based at least in part on the type of handover to be performed increases the overall efficiency of the wireless network.

51 Claims, 9 Drawing Sheets

METHODS FOR INTRA BASE STATION HANDOVER OPTIMIZATIONS

CROSS-REFERENCE TO RELATED APPLICATIONS

The present Application for Patent claims priority to Provisional Application No. 60/976,385 entitled "E-NODE-B HANDOVER METHODS AND SYSTEMS" which was filed Sep. 28, 2007, and assigned to the assignee hereof and hereby expressly incorporated by reference herein.

Further, the present Application for Patent is a Continuation of patent application Ser. No. 12/237,050 entitled "METHODS FOR INTRA BASE STATION HANDOVER OPTIMIZATIONS" filed Sep. 24, 2008, pending, and assigned to the assignee hereof and hereby expressly incorporated by reference herein.

BACKGROUND

1. Field

The present aspects relate to wireless communication devices, and more particularly, to systems and methods for optimization of intra-node handover scenarios.

2. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc.). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems often employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Optimization of network coverage and service quality are constant goals for wireless network operators. Superior coverage and service quality results in enhanced user experiences, greater throughput, and ultimately increased revenue. One way to achieve superior coverage and service quality is through increased network efficiency. For the purpose of this description a handover or handoff may refer to a hand over from a base station to another base station as well as a hand over from and to the same base station. Further the hand over may be initiated by the network or by the mobile terminal. The terminal may initiate a handover according to the principles of forward handover, or to re-establish a connection with an appropriate base station after experiencing outage. Further, the handover may occur in order to support mobility of users in the wireless system, or to provide balancing of load, or to facilitate various reconfigurations of the connection or to facilitate handling of unforeseeable error cases. Unfortunately, current techniques do not provide for generating increased network performance efficiency through intra base station handover optimization.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The subject disclosure provides for intra base station handover optimizations. In some aspects disclosed is a method for performing a handover in a wireless communication system, which includes determining whether an intra-base station or an inter-base station handover is to be performed, and performing the handover without resetting at least one of the user plane communication protocols.

In other aspects disclosed is a base station, comprising wireless transmission and reception circuitry, and handover circuitry coupled to the wireless transmission and reception circuitry configured to determine at least one of whether an intra-Base station or an inter-Base station handover is to be performed by a UE, or whether to not reset at least one of the user plane communication protocols if an intra-Base station handover is to be performed.

According to still other aspects, provided is a User Equipment (UE) that includes wireless transmission and reception circuitry, and handover circuitry coupled to the wireless transmission and reception circuitry and configured to perform a handover without resetting at least one of the RLC, RoHC and PDCP layers if an intra-Base station handover is to be performed.

In one or more other aspects, disclosed is a computer program product for performing a handover in a wireless communication network, including a computer-readable medium that includes code for performing the handover without resetting at least one of the RLC, RoHC and PDCP layers if an intra-Base station handover is to be performed, and code for performing the handover with resetting at least one of the RLC, RoHC and PDCP layers if an inter-Base station handover is to be performed.

In other aspects disclosed is an apparatus including means for performing the handover without resetting at least one of the RLC, RoHC and PDCP layers if an intra-Base station handover is to be performed, and means for performing the handover with resetting at least one of the RLC, RoHC and PDCP layers if an inter-Base station handover is to be performed.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
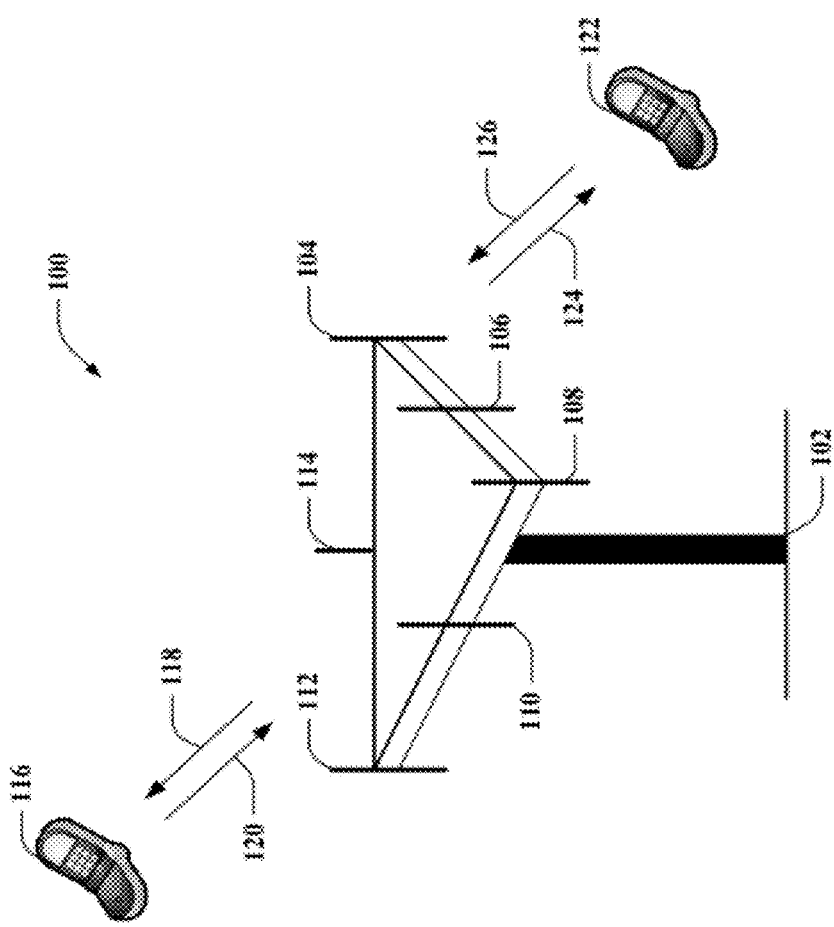
FIG. 1 illustrates an exemplary multiple access wireless communication system in accordance with an aspect of the subject specification.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident; however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, enhanced NodeB (eNB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Additionally, the word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are described in documents from an organization named "3rd Generation Partnership Project" (3GPP). CDMA 2000 is described in documents from an organization named "3rd Generation Partnership Project 2" (3GPP2). These various radio technologies and standards are known in the art.

Referring now to FIG. 1, a wireless communication system 100 is illustrated in accordance with the subject innovation. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. Moreover, the system 100 can be a multiple-bearer system. A bearer can be an information path of defined capacity, delay, bit error rate, etc. Mobile devices 116 and 122 can each serve one or more radio bearers. The mobile devices 116 and 122 can employ uplink rate control mechanisms to manage and/or share uplink resources across the one or more radio bearers. In one example, the mobile devices 116 and 122 can utilize token bucket mechanisms to serve the radio bearers and to enforce uplink rate limitations.

Pursuant to an illustration, each bearer can have an associated prioritized bit rate (PBR), maximum bit rate (MBR) and guaranteed bit rate (GBR). The mobile devices 116 and 122 can serve the radio bearers based, at least in part, on the associated bit rate values. The bit rate values can also be employed to calculate queue sizes that account for PBR and MBR for each bearer. The queue sizes can be included in uplink resource requests transmitted by the mobile devices 116 and 122 to the base station 102. The base station 102 can schedule uplink resources for mobile device 116 and 122 based upon respective uplink requests and included queue sizes.

Figure 2:
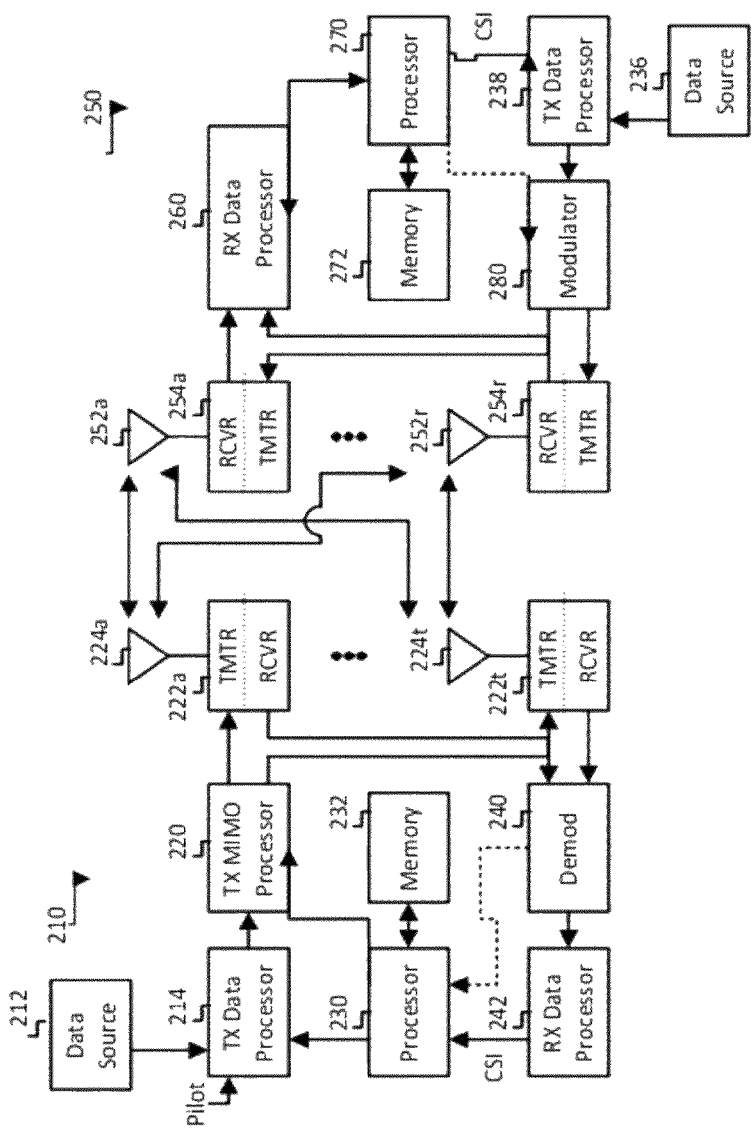
FIG. 2 illustrates an example general component block diagram of a communication system in accordance with an aspect of the subject specification.

FIG. 2 is a general component block diagram of a transmitter system 210 (also known as the access point or base station) and a receiver system 250 (also known as access terminal) in a MIMO system 200. At the transmitter system 210, traffic data for a number of data streams is provided from a data source 212 to a transmitter (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
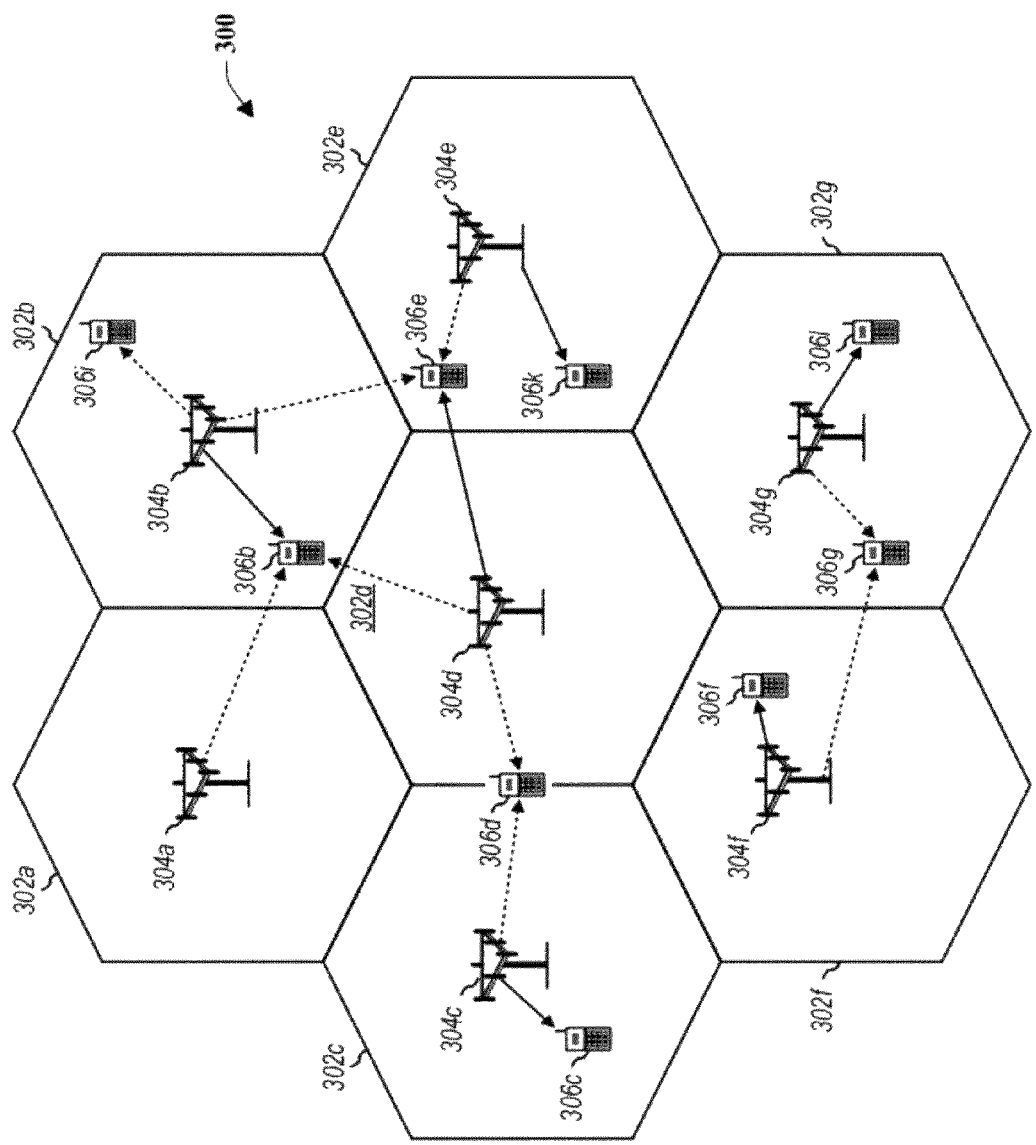
FIG. 3 illustrates an example wireless communication system in accordance with an aspect of the subject specification.

FIG. 3 illustrates an exemplary wireless communication system 300 configured to support a number of users, in accordance with an embodiment of the subject innovation. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g. by using directional antennae). Various access terminals (ATs) 306, including ATs 306a-306k, also known interchangeably as user equipment (UE) or mobile stations, are dispersed throughout the system. Each AT 306 may communicate with one or more APs 304 on a forward link (FL) and/or a reverse link (RL) at a given moment, depending upon whether the AT is active and whether it is in soft handoff, for example. The wireless communication system 300 may provide service over a large geographic region, for example, macro cells 302a-302g may cover a few blocks in a neighborhood.

It is to be appreciated that for various different communications standards, such as some of the standards developed by the 3GPP standards-making body, the terms "sector" and "cell" are not distinguished functionally. Accordingly, each Node B may be thought of as supporting multiple cells.

Figure 4:
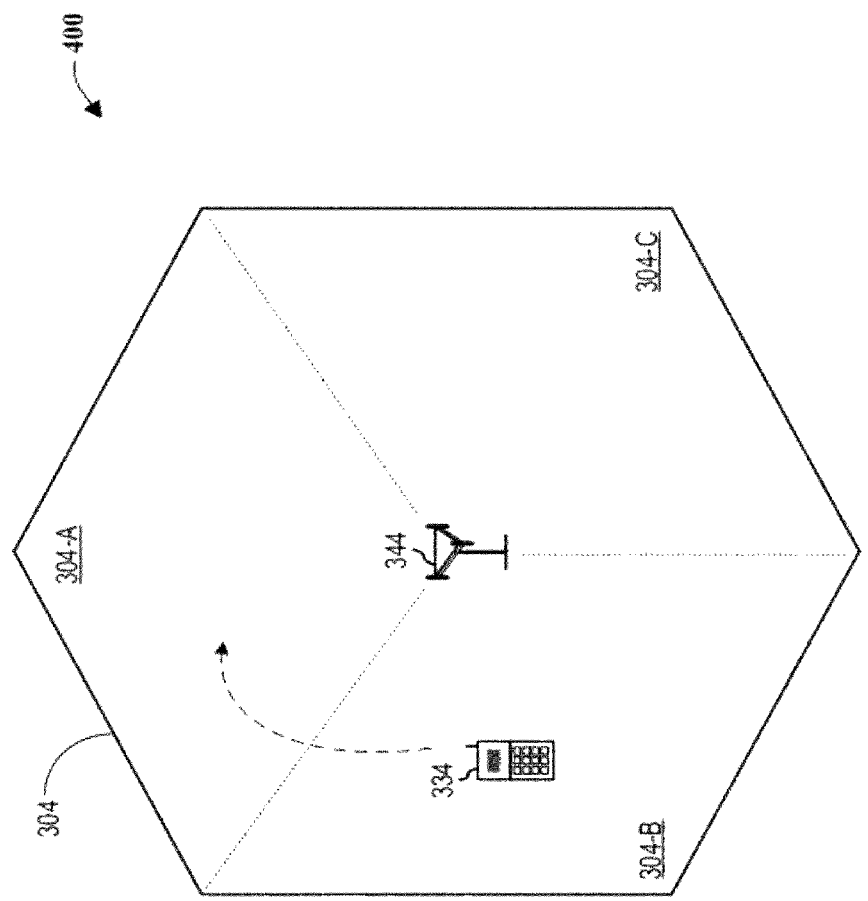
FIG. 4 illustrates an example wireless communication system in accordance with an aspect of the subject specification.

Referring now to FIG. 4, an example wireless communication system 400 is illustrated in accordance with an aspect of the subject innovation. A Node-B 344 is depicted as supporting three separate cells 304-A, 304-B and 304-C. Accordingly, as a particular UE 334 moves from cell 304-B to cell 304-A, a handover or handoff will be performed, for instance, when UE 334 moves from the area serviced by Node-B 344 to the area serviced by Node-B 346. For the purposes of this disclosure, a handoff between two cells serviced by two separate Node-Bs will be referred to as an "inter-node handoff" while a handoff between two cells serviced by a single Node-B will be referred to as an "intra-Node-B handoff."

It can be appreciated that not distinguishing the types of handoffs can result in an inefficient allocation of resources. For example, as messages propagate from a communication framework (e.g. the Internet, etc.) to a UE 334, such messages will undergo a transmission from Internet Protocol (IP) to Packet Data Convergence Protocol (PDCP) to Radio Link Control (RLC) to Physical Layer Protocol Data Units. During such transfers, individual IP packets may be broken into a number of small RLC PDUs in order to match to the capacity available for that user. At handover the PDCP, RLC, MAC and Physical Layer are reset therefore as a result, any IP PDU that is not completely transmitted must be restarted from the beginning. In addition protocols that maintain state such as a Header Compression (HC) algorithm hosted in the PDCP will need to re-create their state, thereby incurring inefficient compression. Further, a ciphering key change may also be triggered while not necessary. The Robust Header Compression (RoHC) is an example HC protocol used in EUTRA. We later use RoHC as an example to any HC protocol.

The optimization for an intra-Node-B handover scenario is achievable, because virtually all the communication context related to the UE 344 PDCP, RLC and MAC remains in the same physical location. Depending on the implementation, there can be at least a portion of the software that operates all the cells in the eNB. As discussed in greater detail below, in such cases intra-Node-B handover can be optimized to provide one or more of the following benefits possible: no reset at the PDCP layer and RLC layer are necessary, no need to enable the PDCP "handoff related" re-ordering function (since RLC is persistent and performs re-ordering when necessary); no need to exchange PDCP SN status on the downlink and uplink (since all states are kept in RLC), no need to install a new security key set and no need to reset at the RoHC layer.

Optimizing the intra-Node-B handover can maximize user-plane efficiency during handover with limited complexity. A persistent RLC state can enable optimum wireless performance, wherein partially transmitted and/or received SDUs need not be retransmitted after a handover. Additionally, a persistent RLC state can allow a system to not use the PDCP handoff related functions that may use additional resources on the air interface and may delay delivery of user-plane data. Moreover, persistent PDCP context can provide significant IP-header overhead savings, due to the continuation of the Header Compression across handover, which is highly useful during the first instants of RoHC context setup, when the IP/UDP/RTP header overhead is higher. This is especially useful on the uplink for UEs at the far edge of a cell. The need to install new security key-set stems from the potential reset of PDCP sequence numbers at handover. It can be cryptographically unsafe to re-use a PDCP sequence number on with an identical key. However, if PDCP is not reset at handover, there is no need for deriving, retrieving and using a new key.

Figure 5:
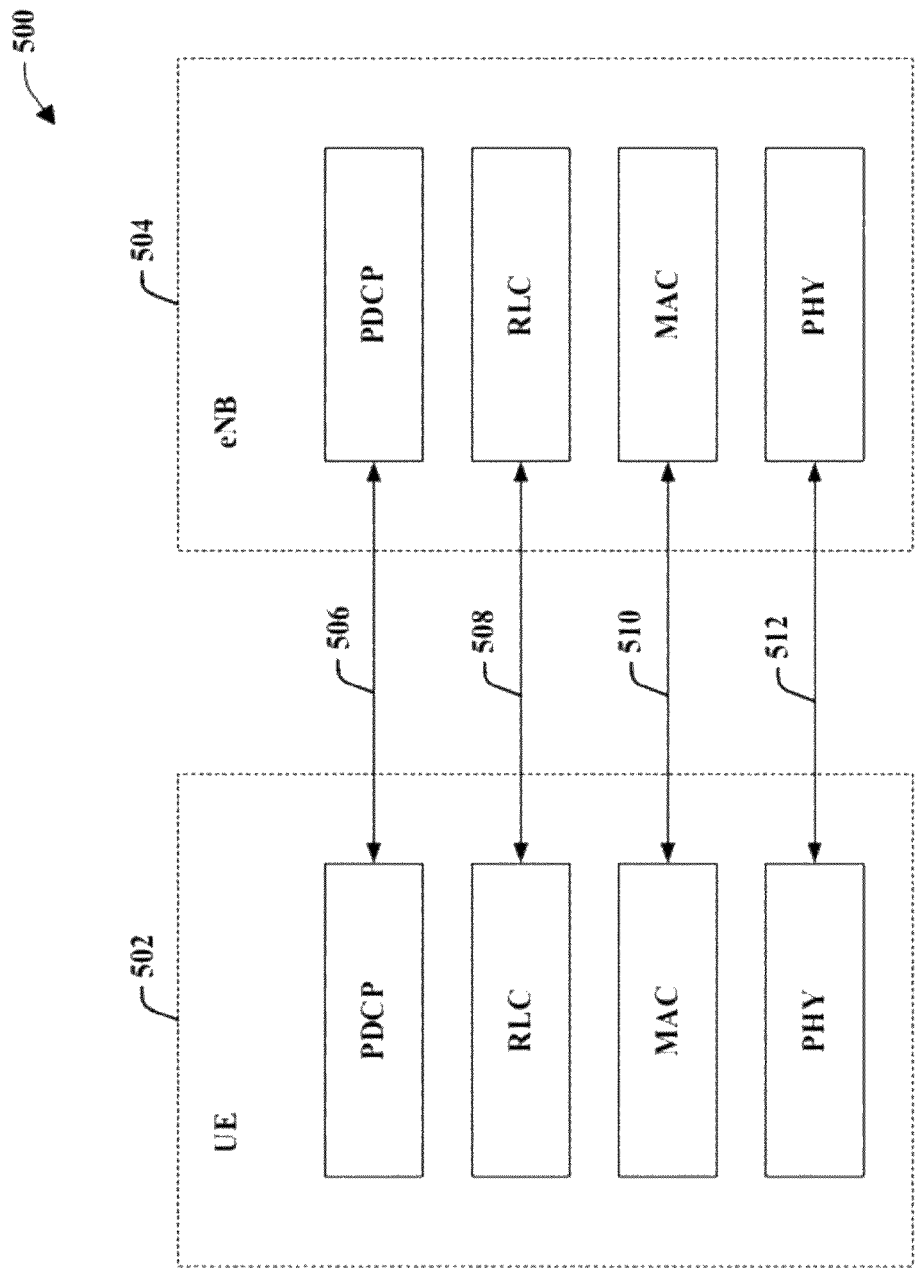
FIG. 5 is an example wireless communication system illustrating a user-plane stack protocol in accordance with an aspect of the subject specification.

Referring now to FIG. 5, an example wireless communication system 500 illustrating a user-plane stack protocol is shown in accordance with an aspect of the subject innovation. The system 500 includes a UE 502 and an eNB 504. The UE 502 and eNB 504 can exchange, transfer, or otherwise communicate via one or more protocols, including a packet data conversion protocol (PDCP) 506, a Radio Link Control (RLC) 508, a media access control (MAC) 510, and/or a Physical Layer (PHY) 512.

The PDCP 506 provides ciphering and integrity protection for messages communicated between the UE 502 and eNB 504. In addition, the PDCP 506 provides methods for header compression, and can be involved in handover to provide lossless communication and ordered delivery. The RLC 508 provides ordered lossless delivery thanks to automatic repeat request (ARQ). An ARQ is issued when one or more packets are lost, and contains a request for the sender to retransmit the packet. The RLC 508 can have one or more transmission modes (e.g. commonly called modes), including an acknowledged mode (AM) that request retransmission of a packet, an unacknowledged mode (UM) where no request to retransmit are used, and a transparent mode that is most often used for signaling. The RLC 508 operates on a per packet basis. For instance, a set of packets 1, 2, and 3 can comprise a single IP packet. If packets 1 and 3 are successfully received, but packet 2 is missing or lost during transmission then the RLC 508 can issue an ARQ for the sender to retransmit packet 2. It can be appreciated that if the RLC is reset during a handover, then the benefit of having already transmitted packets 1 and 3 will be lost, and duplicate bits will be transmitted. The MAC 510 controls scheduling and sharing of the subject medium. The PHY 512 translates communications requests from a Data Link Layer (not shown) into hardware-specific operations to affect transmission or reception of electromagnetic signals.

The protocols 506-512 have a state during operation of the system 500. However, during most any type of handover (e.g. inter-node or intra-Node-B) the system 500 typically resets the previously mentioned protocols, including at least part of the PDCP 506, the RLC 508, the MAC 510 and the PHY (512). The protocols are reset to avoid the transfer of the communication context from a first eNB to a second eNB. It can be appreciated that during an intra-Node-B handover the communication context reside in the same physical location (e.g. same eNB), and resetting the protocols can be unnecessary and inefficient.

Figure 6:
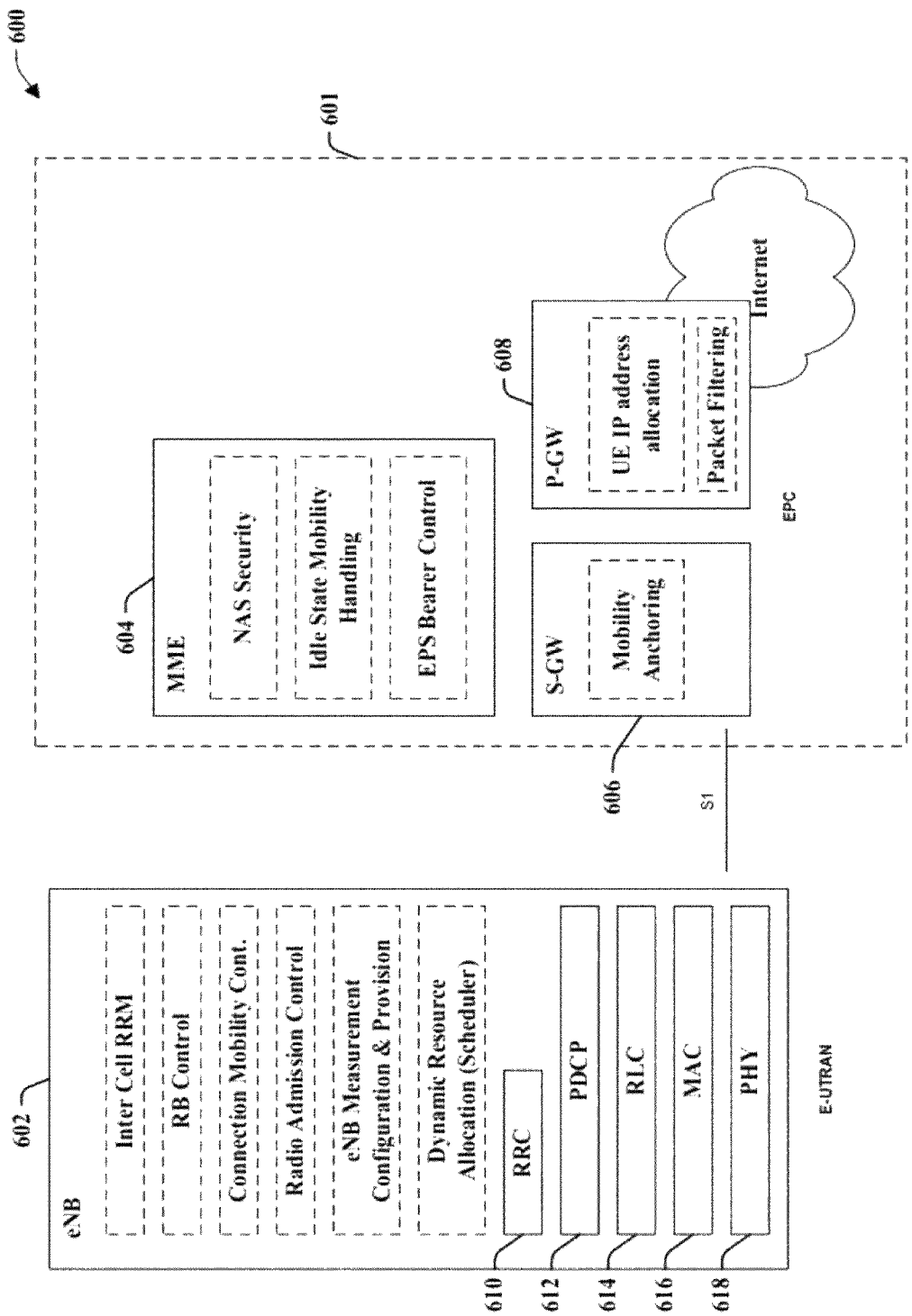
FIG. 6 illustrates an example wireless communication system in accordance with an aspect of the subject specification.

Referring now to FIG. 6, an example wireless communication system 600 illustrating communication between an eNB 602 and an evolved packet core (EPC) 601. The EPC 601 is a central component in the long term evolution (LTE) access-network. It is to be appreciated that the LTE access-network shown is but one example of how the subject innovation can be employed, and it will be readily apparent to those skilled in the art that the systems and methods discussed herein can be applied to a plurality of network types.

The EPC 601 includes a Mobility Management Entity (MME) 604, a serving gateway (S-GW) 606, and a PDN gateway (P-GW) 608. The MME 604 is a control-node for the LTE access-network, and is responsible for idle mode UE tracking and paging procedure including retransmissions. The MME 604 is involved in the bearer activation/deactivation process and is also responsible for choosing the S-GW 606 for a UE at the initial attach and during an intra-Node-B handover. The MME 604 is responsible for authenticating users, and the Non-Access Stratum (NAS) security signaling terminates at the MME 604. In addition, it is also responsible for generation and allocation of temporary identities to UEs, and checks the authorization of the UE to camp on the service provider's Public Land Mobile Network (PLMN) and enforces UE roaming restrictions. The MME is the termination point in the network for ciphering/integrity protection for NAS security signaling and handles the security key management.

The S-GW 606 routes and forwards SDUs, while also acting as the mobility anchor for the user plane during inter-node handovers. For idle state UEs, the S-GW 606 terminates the DL data path and triggers paging when DL data arrives for the UE. The S-GW 606 manages and stores UE contexts (e.g. parameters of the IP bearer service, network internal routing information).

The P-GW 608 provides connectivity to the UE to external packet data networks as a point of exit and entry of traffic for the UE. A UE may have simultaneous connectivity with more than one P-GW 608 for accessing multiple PDNs. The P-GW 608 performs policy enforcement, packet filtering for each user, charging support, lawful Interception and packet screening.

As previously discussed, the eNB 602 includes a PDCP 612, a RLC 614, a MAC 616, and a PHY 618. In addition, the eNB 602 includes a radio resource control (RRC) 610. The RRC 610 is a control plane entity that can direct the UE to perform an intra-Node-B or inter-node handover. In operation, the RRC 610 can transmit a handover command to the UE, wherein the command indicates the handover type (e.g. intra-Node-B or inter-node). The LTE is an IP system, and all packets have an IP header. For example, for a voice of internet protocol (VoIP) application the headers may include one or more IP, UDP, and/or RDP headers and payload. Due to the size of the headers it can be inefficient to transmit the headers over the air via the network, for example for Voice over IP (VoIP), the ratio of headers to payload can be approximately half and half. Therefore, the PDCP 612 may use one or more header compression protocols, such as Robust Header Compression (RoHC). The RoHC is a state-full header compression protocol that can significantly reduce the size of headers, for example, from about 40 bytes to about 3 to 4 bytes. Typically, during a handover scenario the RoHC is reset. It can be appreciated that resetting the RoHC during an intra-Node-B handover causes unnecessary inefficiency by resetting the header compression protocols, thereby losing compression state at the transmitter and receiver. Consequently, maintaining a persistent PDCP state militates against the necessity to reset the RoHC when the protocols reside at the same location, such as during an intra-Node-B handover.

Figure 7:
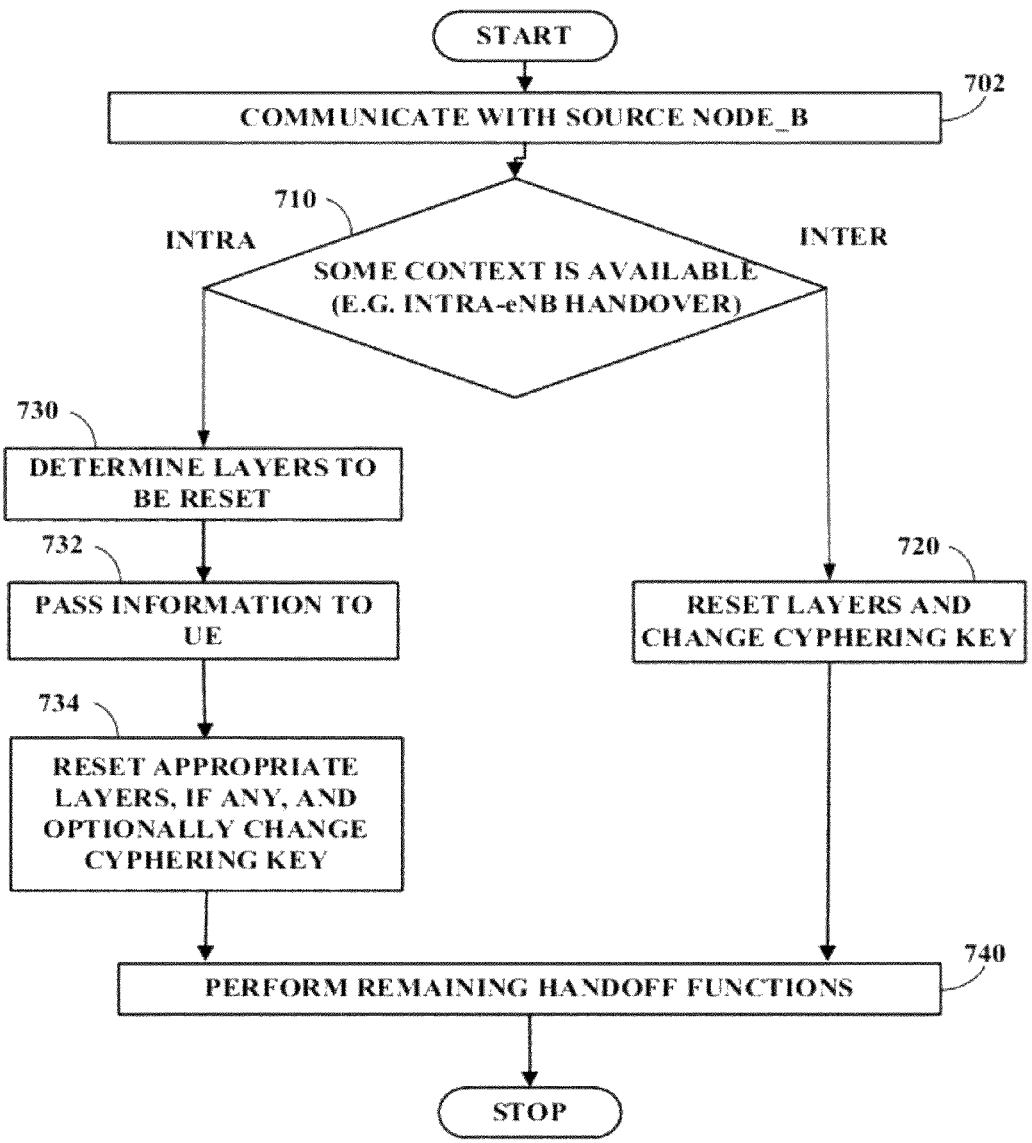
FIG. 7 is a flow chart illustrating a generalized methodology that facilitates handover optimization in accordance with an aspect of the subject specification.

In view of the exemplary systems described supra, methodologies that may be implemented in accordance with the disclosed subject matter will be better appreciated with reference to the flow chart of FIG. 7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 7 illustrates a generalized methodology for intra-Node-B handover optimizations in accordance with an aspect of the subject innovation. At 702, communication is established between a first Node-B and a UE. At 710, assuming that a handoff is to occur with the UE, a determination is made as to whether the handoff is an inter-node or intra-Node-B handoff. At 720, if the handoff is an inter-node handoff virtually any or all of the appropriate (e.g. RLC, PDCP, RoHC and RCDP) layers can be reset.

At 730, if the handoff is an intra-Node-B handoff a determination can be made as to which protocol layers (e.g. RLC, PDCP, RoHC, and/or RCDP), if any, are to be reset—typically by the target Node-B. It will be appreciated that the determination as to which protocol layers will be reset can be accomplished by a plurality of techniques. For instance, in one embodiment dedicated signaling form the target node to the UE can be used to determine which layers to reset, and provide for multiple levels of granularity. In another embodiment, dedicated signaling with backward handover allows a target Node-B to indicate to the UE which layers to reset using a "transparent container" in a handover request acknowledge. The "transparent container" can contain fields for each layer, for example as indicated in Table 1, wherein the bit corresponding to the field instructs the UE to reset the layer.

TABLE 1

| Command | Size [bits] |
| --- | --- |
| RLC reset | 1 |
| RoHC reset | 1 |
| PDCP SN exchange | 1 |
| Ciphering key change | c |

In yet another embodiment, in cases where the terminal initiates the handover on its own (forward handover) or as a result of a connection re-establishment, whether to re-set above protocols may be indicated by the eNB, or derived based on parameters indicated in the system information broadcast over the air, or indicated in the specification. Dedicated signaling can be used at 730. The target Node B may obtain the context relevant for that UE from the source node B based on the UE identifier used in the random access procedure for contention resolution (e.g. C RNTI of the UE in the cell where the RLF occurred and physical layer identity of that cell and the MAC based on the keys of that cell).

If the Node-B finds the appropriate communications context information or is able to fetch the communications context information that matches the identity of the UE in reasonable time, the Node-B can indicate to the UE that its connection can be resumed. In the same message and depending on availability of RLC/RoHC/Ciphering context, the Node-B can pass information to the UE if any or all of the protocols (e.g. RLC, RoHC, Ciphering state, etc.) must be reset. If some of the appropriate communications context information is not found, the related protocols are reset.

Additionally or alternatively, unique signaling can be used to determine which protocol layers need to be reset. For instance only 1-bit of information may be used to indicate if a set of protocols (example PDCP and RLC) are re-set or not. The UE can then be instructed not to reset these protocols during the intra-Node-B handover while always resetting them during an inter-Node-B handover.

In addition, there are at least two options to signal the type of handover to the UE, including Unicast Handover type and Broadcast Handover type. Unicast handover type provides that at the time of handover, a target Node-B can determine if the handover is intra-Node-B or inter-Node-B. This can be done via a single signaling bit (e.g. intra/inter eNB) which may be embedded in the transparent container in the handover request acknowledge. The source Node-B can generate and send the appropriate handover command (e.g. RRC message) to the UE. The handover command may include the transparent container received from the target Node-B.

During operation, the UE can determine whether to reset each protocol upon accessing the target Node-B. Note that this signaling method still leaves the freedom to not implement any optimization as, during intra-Node-B handover, the target Node-B may decide to indicate "inter-Node-B handover" in the transparent container of the handover request acknowledge.

In the case of connection re-establishment, the target Node-B can indicate intra or inter Node-B handover to the UE in the message that indicates its connection can be resumed. Should the context not become available, all the layer 2 user plane protocols can be reset. Broadcast handover type (e.g. broadcasting Node-B identification (eNB ID) provides that, as explained previously, first agreement is reached regarding which protocols are persistent during intra-Node-B handover. Further one needs to agree that the optimization is always done for inter-Node-B handover.

In this approach, a locally unique eNB ID can be broadcast for instance on a P-BCH or D-BCH. Upon handover, the UE can determine whether an intra-Node-B or inter-Node-B handover is occurring and can thus set the RLC/PDCP states accordingly. This approach can be used in the regular handover as well as in forward handover and connection re-establishment since no dedicated signaling is required.

Optimizing intra-Node-B handovers in the previously discussed manners, such that all the protocol layers are not reset can have several benefits. For instance, if the RLC is not reset there is a reduction in the number of duplicate bits transmitted as a result of the handover (discussed supra). In addition, not resetting the PDCP can also reduce the amount of duplicate data transmitted as a result of a handover. As previously, discussed the PDCP handles retransmission by exchanging status reports, wherein a receiver informs a sender of the data it has received and has not received. For example, a UE retransmits in cumulative fashion all packets that are not known to be acknowledged. A set of IP packets sequenced from one to ten are being transmitted, and the last packet that has been acknowledged prior to a handover is packet five. The UE will retransmit packets six through ten regardless of receipt, because the PDCP has been reset. Similarly, maintaining a constant state with the protocols can reduce the necessity to exchange PDCP SN status on uplink and/or downlink. Also, as previously discussed, efficiency during an intra-Node-B handover can be increased by not resetting the RoHC layer.

A refinement of the 1-bit intra/inter node bit handover may be done by identifying which protocol, or component thereof is reset/not reset at handover. For instance a bitmap may be used to indicate separately if PDCP/HC/RLC/MAC are to be reset for this occurrence of handover. The bitmap may be sent with dedicated signaling as part of handover. This accommodates more flexible implementations, where for instance if RLC context can be shared, but PDCP cannot, then only RLC state is maintained. At 732, information pertaining to which layers are to be reset and/or a simple indication (e.g. flag) indicating that an intra-Node-B handoff is to occur is sent to the UE. At 734, the appropriate layers are reset and/or the appropriate compression/ciphering key can be changed. At 740, any remaining handoff functions can be performed.

Figure 8:
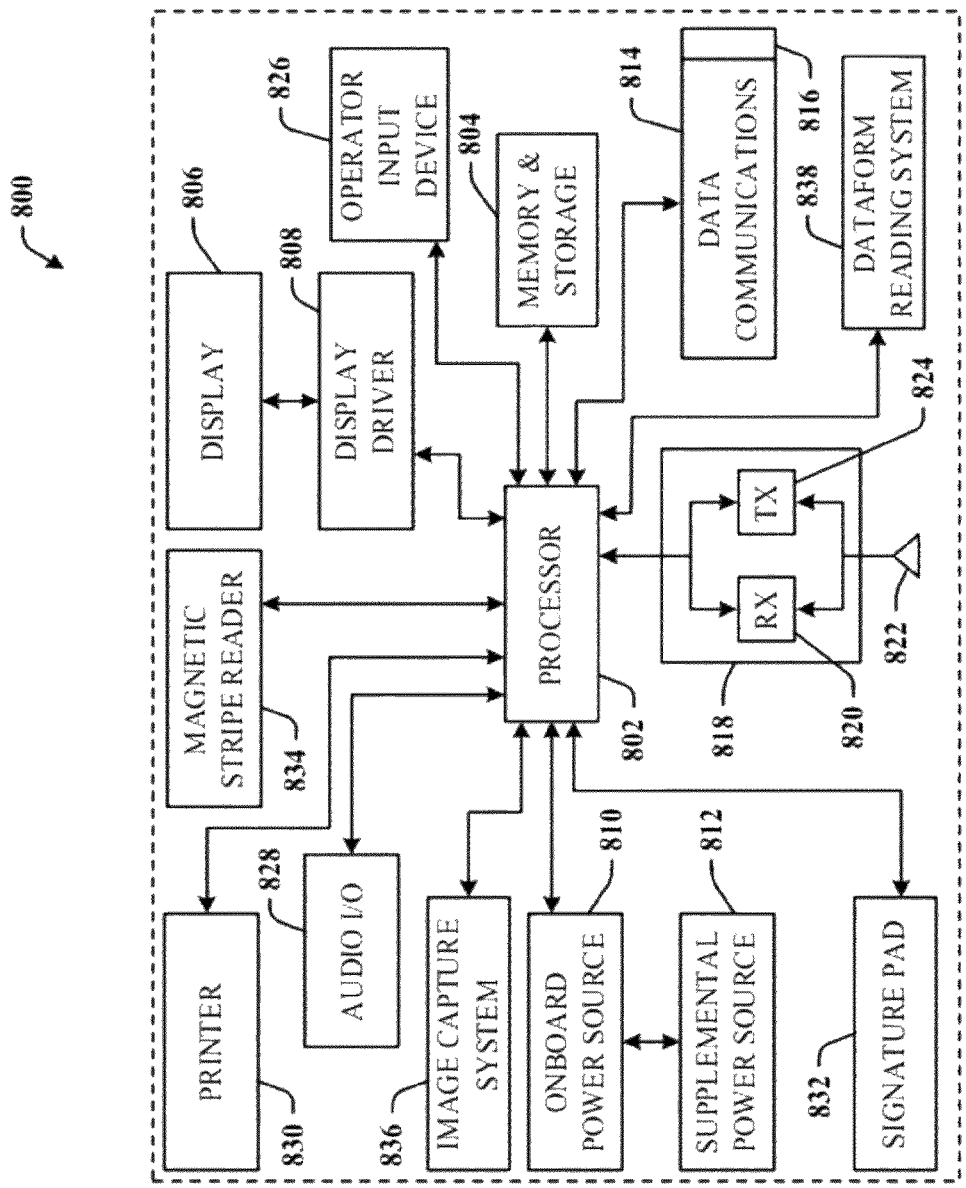
FIG. 8 illustrates an example device operative to execute the one or more embodiments disclosed herein.

Referring now to FIG. 8, illustrated is a schematic block diagram of a portable hand-held terminal device 800, in which a processor 802 is responsible for controlling the general operation of the device 800. The processor 802 is programmed to control and operate the various components within the device 800 in order to carry out the various functions described herein. The processor 802 can be any of a plurality of suitable processors. The manner in which the processor 802 can be programmed to carry out the functions relating to the invention will be readily apparent to those having ordinary skill in the art based on the description provided herein.

A memory 804 connected to the processor 802 serves to store program code executed by the processor 802, and serves as a storage means for storing information such as user credential and receipt transaction information and the like. The memory 804 can be a nonvolatile memory suitably adapted to store at least a complete set of the information that is displayed. Thus, the memory 804 can include a RAM or flash memory for high-speed access by the processor 802 and/or a mass storage memory, e.g., a micro drive capable of storing gigabytes of data that comprises text, images, audio, and video content. According to one aspect, the memory 804 has sufficient storage capacity to store multiple sets of information, and the processor 802 could include a program for alternating or cycling between various sets of display information.

A display 806 is coupled to the processor 802 via a display driver system 808. The display 806 can be a color liquid crystal display (LCD), plasma display, or the like. In this example, the display 806 is a ¼ VGA display with sixteen levels of gray scale. The display 806 functions to present data, graphics, or other information content. For example, the display 806 can display a set of customer information, which is displayed to the operator and can be transmitted over a system backbone (not shown). Additionally, the display 806 can display a variety of functions that control the execution of the device 800. The display 806 is capable of displaying both alphanumeric and graphical characters.

Power is provided to the processor 802 and other components forming the hand held device 800 by an onboard power system 810 (e.g., a battery pack). In the event that the power system 810 fails or becomes disconnected from the device 800, a supplemental power source 812 can be employed to provide power to the processor 802 and to charge the onboard power system 810. The processor 802 of the device 800 induces a sleep mode to reduce the current draw upon detection of an anticipated power failure.

The terminal 800 includes a communication subsystem 814 that includes a data communication port 816, which is employed to interface the processor 802 with a remote computer. The port 816 can include at least one of Universal Serial Bus (USB) and IEEE 1394 serial communications capabilities. Other technologies can also be included, for example, infrared communication utilizing an infrared data port.

The device 800 can also include a radio frequency (RF) transceiver section 818 in operative communication with the processor 802. The RF section 818 includes an RF receiver 820, which receives RF signals from a remote device via an antenna 822 and demodulates the signal to obtain digital information modulated therein. The RF section 818 also includes an RF transmitter 824 for transmitting information to a remote device, for example, in response to manual user input via a user input device 826 (e.g., a keypad) or automatically in response to the completion of a transaction or other predetermined and programmed criteria. The transceiver section 818 facilitates communication with a transponder system, for example, either passive or active, that is in use with product or item RF tags. The processor 802 signals (or pulses) the remote transponder system via the transceiver 818, and detects the return signal in order to read the contents of the tag memory. In one implementation, the RF section 818 further facilitates telephone communications using the device 800. In furtherance thereof, an audio I/O section 828 is provided as controlled by the processor 802 to process voice input from a microphone (or similar audio input device) and audio output signals (from a speaker or similar audio output device).

In another implementation, the device 800 can provide voice recognition capabilities such that when the device 800 is used simply as a voice recorder, the processor 802 can facilitate high-speed conversion of the voice signals into text content for local editing and review, and/or later download to a remote system, such as a computer word processor. Similarly, the converted voice signals can be used to control the device 800 instead of using manual entry via the keypad 826.

Onboard peripheral devices, such as a printer 830, signature pad 832, and a magnetic strip reader 834 can also be provided within the housing of the device 800 or accommodated externally through one or more of the external port interfaces 816.

The device 800 can also include an image capture system 836 such that the user can record images and/or short movies for storage by the device 800 and presentation by the display 806. Additionally, a dataform reading system 838 is included for scanning dataforms. It is to be appreciated that these imaging systems (836 and 838) can be a single system capable of performing both functions.

Figure 9:
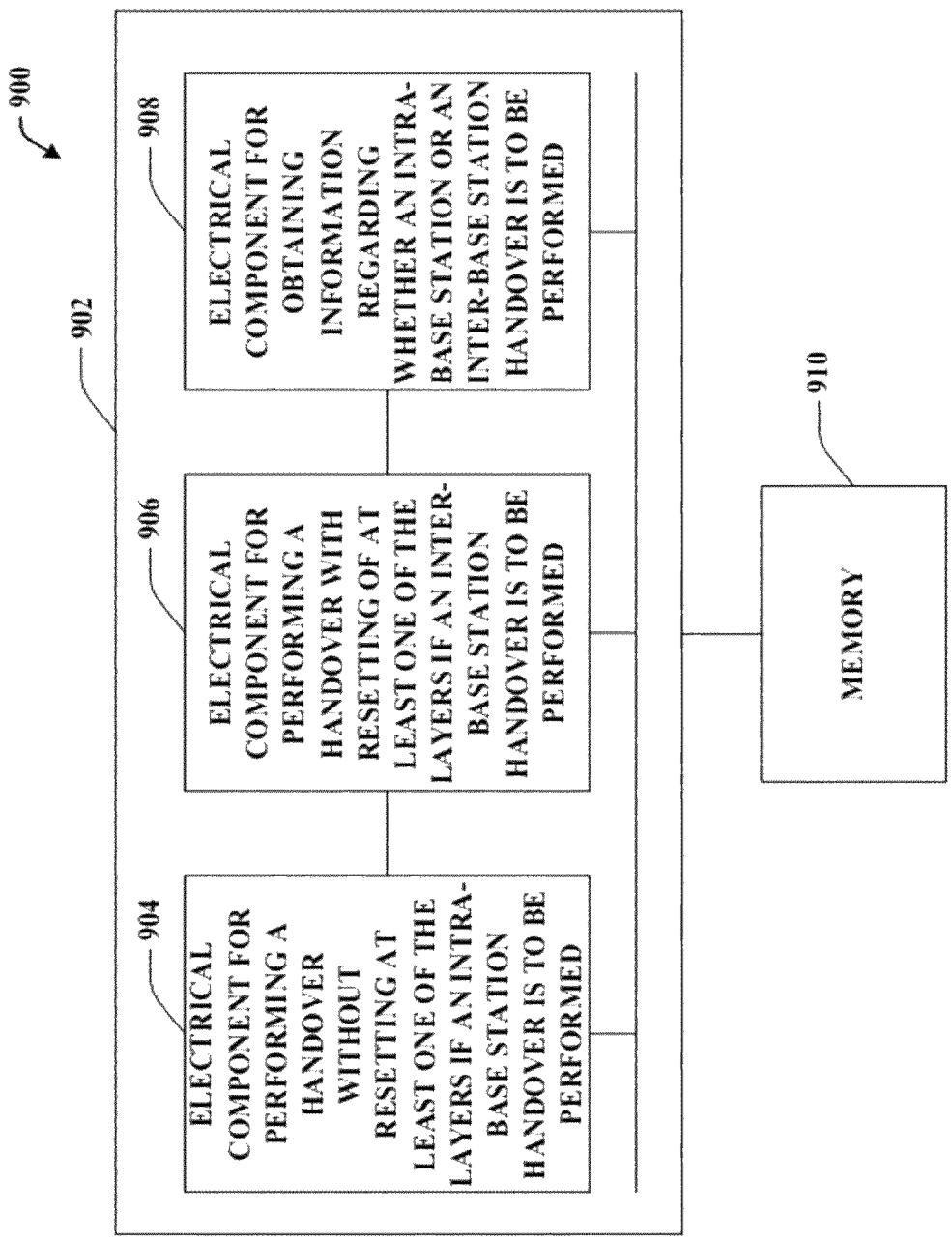
FIG. 9 is an illustration of an example system that facilitates optimizing intra-base station handover in accordance with an aspect of the subject specification.

With reference to FIG. 9, illustrated is a system 900 that facilitates specifying a keyset from a plurality of keyset employed in a transmission. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for performing a handover without resetting at least one of the layers if an intra-base station handover is to be performed 904. Further, logical grouping 902 can comprise an electrical component for performing a handover with resetting of at least one of the layers if an inter-base station handover is to be performed 906. Moreover, logical grouping 902 can comprise an electrical component for obtaining information regarding whether an intra-base station or an inter-base station handover is to be performed 908. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for performing a handover in a wireless communication system comprising:
   determining whether an intra-base station handover or an inter-base station handover is to be performed;
   generating a handover command comprising a reset indicator that corresponds to a plurality of user plane communication protocols;
   instructing a terminal to perform the handover without resetting at least one of the user plane communication protocols based on the reset indicator if the intra-base station handover is to be performed; and
   instructing the terminal to perform the handover while resetting at least one of the user plane communication protocols based on the reset indicator if the inter-base station handover is to be performed.

2. The method of claim 1, further comprising establishing a communication session with the terminal, wherein the communication session operates according to the plurality of user plane communication protocols, and wherein the plurality of user plane communication protocols operate between a base station and the terminal.

3. The method of claim 1, wherein generating the handover command comprising the reset indicator further comprises generating the reset indicator to signal a reset of more than one of the plurality of user plane communication protocols.

4. The method of claim 1, wherein the user plane communication protocols include at least one of a Medium Access Control, a Radio Link Control, a Packet Data Convergence Protocol, a Header Compression, or a Security Key.

5. The method of claim 1, further comprising performing the handover without resetting any of the user plane communication protocols if the intra-base station handover is to be performed.

6. The method of claim 1, further comprising performing the handover while resetting all of the user plane communication protocols if the inter-base station handover is to be performed.

7. The method of claim 1, wherein instructing the terminal to perform the handover without resetting or while resetting at least one of the user plane communication protocols further comprises transmitting a message including the handover command to the terminal indicating based on the reset indicator which, if any, of the user plane communication protocols are to be reset during the handover.

8. The method of claim 1, further comprising transmitting a message comprising the handover command to the terminal and further indicating whether the handover is the inter-base station handover or the intra-base station handover.

9. A method for performing a handover in a wireless communication system, comprising:
  receiving a handover command comprising a reset indicator that corresponds to a plurality of user plane communication protocols;
  performing the handover without resetting at least one of user plane communication protocols based on the reset indicator if an intra-base station handover is to be performed; and
  performing the handover while resetting at least one of the user plane communication protocols based on the reset indicator if an inter-base station handover is to be performed.

10. The method of claim 9, further comprising establishing a communication session with a base station, wherein the communication session operates according to the plurality of user plane communication protocols, and wherein the plurality of user plane communication protocols operate between the base station and a terminal.

11. The method of claim 9, wherein the reset indicator is used to signal a reset of more than one of the plurality of user plane communication protocols.

12. The method of claim 9, wherein the user plane communication protocols include at least one of a Medium Access Control, a Radio Link Control, a Packet Data Convergence Protocol, a Header Compression, or a Security Key.

13. The method of claim 9, further comprising receiving information from a target base station as to whether the intra-base station handover or the inter-base station handover is to be performed.

14. The method of claim 9, further comprising performing the handover without resetting any of the user plane communication protocols if the intra-base station handover is to be performed.

15. The method of claim 9, further comprising performing the handover while resetting all of the user plane communication protocols if the inter-base station handover is to be performed.

16. The method of claim 9, further comprising receiving a message including the handover command indicating based on the reset indicator which, if any, of the user plane communication protocols are to be reset during the handover.

17. The method of claim 9, further comprising receiving a message including the handover command indicating whether the handover is the inter-base station handover or the intra-base station handover.

18. A communications apparatus, comprising:
  wireless transmission and reception circuitry;
  handover circuitry coupled to the wireless transmission and reception circuitry and configured to:
    determine whether an intra-base station handover or an inter-base station handover is to be performed by a terminal;
    generate a handover command comprising a reset indicator that corresponds to a plurality of user plane communication protocols;
    instruct the terminal to perform the handover without resetting at least one of user plane communication protocols based on the reset indicator if an intra-base station handover is to be performed; and
    instruct the terminal to perform the handover while resetting at least one of the user plane communication protocols based on the reset indicator if an inter-base station handover is to be performed.

19. The apparatus of claim 18, wherein the handover circuitry is further configured to establish a communication session with the terminal, wherein the communication session operates according to the plurality of user plane communication protocols, and wherein the plurality of user plane communication protocols operate between a base station and the terminal.

20. The apparatus of claim 18, wherein when generating the handover command comprising the reset indicator, the handover circuitry is further configured to generate the reset indicator to signal a rest of more than one of the plurality of user plane communication protocols.

21. The apparatus of claim 18, wherein the handover circuitry is further configured to determine whether the intra-base station handover or the inter-base station handover is to be performed based on availability of context pertaining to at least one of the user plane communication protocols.

22. The apparatus of claim 18, wherein the user plane communication protocols include at least one of a Medium Access Control, a Radio Link Control, a Packet Data Convergence Protocol, a Header Compression, or a Security Key.

23. The apparatus of claim 18, wherein the handover is performed without resetting any of the user plane communication protocols if the intra-base station handover is to be performed.

24. The apparatus of claim 18, wherein the handover is performed while resetting all of the user plane communication protocols if the inter-base station handover is to be performed.

25. The apparatus of claim 18, wherein when instructing the terminal to perform the handover without resetting or while resetting at least one of the user plane communication protocols, the wireless transmission and reception circuitry is configured to transmit a message including the handover command to the terminal indicating based on the reset indicator which, if any, of the user plane communication protocols are to be reset during the handover.

26. The apparatus of claim 18, wherein the wireless transmission and reception circuitry is configured to transmit a message comprising the handover command to the terminal and further indicating whether the handover is the inter-base station handover or the intra-base station handover.

27. A wireless communication apparatus, comprising:
  wireless transmission and reception circuitry configured to receive a handover command comprising a reset indicator that corresponds to a plurality of user plane communication protocols;
  handover circuitry coupled to the wireless transmission and reception circuitry and configured to:
    perform a handover without resetting at least one of user plane communication protocols based on the reset indicator if an intra-base station handover is to be performed; and
    perform the handover while resetting at least one of the user plane communication protocols based on the reset indicator if an inter-base station handover is to be performed.

28. The apparatus of claim 27, wherein the handover circuitry is further configured to establish a communication session with a base station, wherein the communication session operates according to the plurality of user plane communication, and wherein the plurality of user plane communication protocols operate between the base station and a terminal.

29. The apparatus of claim 27, wherein the reset indicator is used to signal a reset of more than one of the plurality of user plane communication protocols.

30. The apparatus of claim 27, wherein the wireless transmission and reception circuitry is configured to receive a message including the handover command indicating based on the reset indicator which, if any, of the user plane communication protocols are to be reset during the handover.

31. The apparatus of claim 27, wherein the wireless transmission and reception circuitry is configured to receive a message comprising the handover command indicating whether the handover is an inter-base station handover or intra-base station handover.

32. A computer program product for performing a handover in a wireless communication network, comprising:
a non-transitory computer-readable medium comprising:
code for receiving a handover command comprising a reset indicator that corresponds to a plurality of user plane communication protocols;
code for performing the handover without resetting at least one of user plane communication protocols based on the reset indicator if an intra-base station handover is to be performed; and
code for performing the handover while resetting at least one of the user plane communication protocols based on the reset indicator if an inter-base station handover is to be performed.

33. The computer program product of claim 32, further comprising code for establishing a communication session with a base station, wherein the communication session operates according to the plurality of user plane communication protocols, and wherein the plurality of user plane communication protocols operate between the base station and a terminal.

34. The computer program product of claim 32, wherein the reset indicator is used to signal a reset of more than one of the plurality of user plane communication protocols.

35. The computer program product of claim 32, further comprising code for receiving a message including the handover command indicating based on the reset indicator which, if any, of the user plane communication protocols are to be reset during the handover.

36. The computer program product of claim 32, further comprising code for receiving a message including the handover command indicating whether the handover is the intra-base station handover or the inter-base station handover.

37. A wireless communication apparatus, comprising:
means for receiving a handover command comprising a reset indicator that corresponds to a plurality of user plane communication protocols;
means for performing a handover without resetting at least one of user plane communication protocols based on the reset indicator if an intra-base station handover is to be performed; and
means for performing a handover while resetting at least one of the user plane communication protocols based on the reset indicator if an inter-base station handover is to be performed.

38. The apparatus of claim 37, further comprising means for establishing a communication session with a base station, wherein the communication session operates according to the plurality of user plane communication protocols, and wherein the plurality of user plane communication protocols operate between the base station and a terminal.

39. The apparatus of claim 37, wherein the reset indicator is used to signal a reset of more than one of the plurality of user plane communication protocols.

40. The apparatus of claim 37, further comprising means for receiving a message including the handover command indicating based on the reset indicator which, if any, of the user plane communication protocols are to be reset during the handover.

41. The apparatus of claim 37, further comprising means for receiving a message including the handover command indicating whether the handover is the intra-base station handover or the inter-base station handover.

42. A computer program product for performing a handover in a wireless communication network, comprising:
a non-transitory computer-readable medium comprising:
code for determining whether an intra-base station handover or an inter-base station handover is to be performed;
code for generating a handover command comprising a reset indicator that corresponds to a plurality of user plane communication protocols;
code for instructing a terminal to perform the handover without resetting at least one of user plane communication protocols based on the reset indicator if an intra-base station handover is to be performed; and
code for instructing the terminal to perform the handover while resetting at least one of the user plane communication protocols based on the reset indicator if an inter-base station handover is to be performed.

43. The computer program product of claim 42, further comprising code for establishing a communication session with the terminal, wherein the communication session operates according to the plurality of user plane communication protocols, and wherein the plurality of user plane communication protocols operate between a base station and the terminal.

44. The computer program product of claim 42, wherein the code for generating the handover command comprising the reset indicator further comprises code for generating the reset indicator to signal a reset of more than one of the plurality of user plane communication protocols.

45. The computer program product of claim 42, wherein the user plane communication protocols include at least one of a Medium Access Control, a Radio Link Control, a Packet Data Convergence Protocol, a Header Compression, or a Security Key.

46. The computer program product of claim 42, wherein the code for instructing the terminal to perform the handover without resetting or while resetting at least one of the user plane communication protocols further comprises code for transmitting a message including the handover command to the terminal indicating based on the reset indicator which, if any, of the user plane communication protocols are to be reset during the handover.

47. A wireless communication apparatus, comprising:
means for determining whether an intra-base station handover or an inter-base station handover is to be performed;
means for generating a handover command comprising a reset indicator that corresponds to a plurality of user plane communication protocols;
means for instructing a terminal to perform the handover without resetting at least one of user plane communication protocols based on the reset indicator if an intra-base station handover is to be performed; and
means for instructing the terminal to perform the handover while resetting at least one of the user plane communication protocols based on the reset indicator if an interbase station handover is to be performed.

48. The apparatus of claim 47, further comprising means for establishing a communication session with the terminal, wherein the communication session operates according to the plurality of user plane communication protocols, and wherein the plurality of user plane communication protocols operate between a base station and the terminal.

49. The apparatus of claim 47, wherein the means for generating the handover command comprising the reset indicator further comprises means for generating the reset indicator to signal a reset of more than one of the plurality of user plane communication protocols.

50. The apparatus of claim 47, wherein the user plane communication protocols include at least one of a Medium Access Control, a Radio Link Control, a Packet Data Convergence Protocol, a Header Compression, or a Security Key.

51. The apparatus of claim 47, wherein the means for instructing the terminal to perform the handover without resetting or while resetting at least one of the user plane communication protocols further comprises transmitting a message including the handover command to the terminal indicating based on the reset indicator which, if any, of the user plane communication protocols are to be reset during the handover.

* * * * *